(12) United States Patent
Willoughby

(10) Patent No.: US 8,712,901 B1
(45) Date of Patent: Apr. 29, 2014

(54) METHOD OR SYSTEM FOR INVESTING AND/OR TRADING

(71) Applicant: Jay Willoughby, Juneau, AK (US)

(72) Inventor: Jay Willoughby, Juneau, AK (US)

(*) Notice: Subject to any disclaimer, the term of this patent is extended or adjusted under 35 U.S.C. 154(b) by 0 days.

(21) Appl. No.: 13/800,122

(22) Filed: Mar. 13, 2013

(51) Int. Cl.
*G06Q 40/06* (2012.01)

(52) U.S. Cl.
USPC ....... 705/36 R; 705/14.14; 705/16; 705/26.1; 705/39

(58) Field of Classification Search
None
See application file for complete search history.

(56) References Cited

U.S. PATENT DOCUMENTS 5,083,784 A * 1/1992 Nilssen ...................... 705/14.14
7,963,840 B2 * 6/2011 Bosarge et al. ................ 463/16
2004/0193431 A1 * 9/2004 Campbell ........................ 705/1
2006/0053062 A1 * 3/2006 Park ................................ 705/26
2009/0012910 A1 * 1/2009 Azaria et al. ................ 705/36 R

* cited by examiner

*Primary Examiner* — Robert Niquette
(74) *Attorney, Agent, or Firm* — Klarquist Sparkman, LLP

(57) ABSTRACT

The present invention relates to a method or system for investing. A representative embodiment comprises providing a collective investment entity that offers shares of stock for sale to investors, and providing a plurality of investors that purchase shares of stock in the collective investment entity. The shares of stock are subject to a qualifying period. Disbursement value is allocated, and a number of eligible investors is determined. The investors are eligible by virtue of owning at least one eligible share of stock. A disbursement event is conducted, wherein the disbursement value is disbursed to at least one eligible investor chosen in a lottery selection process from among the eligible investors. An eligible share of stock comprises a share that has remained under the ownership of a single investor for the duration of the qualifying period.

16 Claims, 5 Drawing Sheets

METHOD OR SYSTEM FOR INVESTING AND/OR TRADING

FIELD

The present disclosure relates to a method or system for investing, and more particularly to methods of encouraging long-term investing by employing lottery and/or raffle-style disbursements in connection with various investment portfolios or other investment systems.

BACKGROUND

There are numerous benefits to be had by individuals, government programs, and the economy at large by incentivizing individuals to make long-term investments, and particularly to save for their own retirement. For example, a collective effort by people to save and make long-term investments can reduce the cost and increase the availability of capital for businesses, reduce financial strain on government programs for retirees, and ensure that individuals can afford medical care and maintain their lifestyle in retirement. The individual retirement account (IRA), which allows an individual to set aside and invest a certain amount of their earned income before paying taxes on that income, constitutes one of the primary investment vehicles available to incentivize long-term savings. Yet, many people do not save as much of their income as they need to, and many do not save anything at all, citing reasons as wide-ranging as inadequate cash flow to maintain a savings account, to distrust of the financial markets, to the belief that the government will take care of them through programs like Social Security.

However, despite the rhetoric describing seemingly risk-averse behavior, many individuals are quick to hazard their capital in high-risk activities such as lottery games, where nearly every participant will lose substantially all the capital they put at risk. Virtually all participants in lottery games are aware of this outcome, and yet many continue to participate on a regular basis for various reasons, including, among others, entertainment purposes, or the remote chance that they will win a substantial amount of money. The utility derived from these lottery incentives have resulted in detrimental long-term behavior when it comes to saving, to the point where, in March, 2012, the Employee Benefit Research Institute found that 60% of households had savings accounts and investments valued at under $25,000, and only 14% of individuals were "very confident" that they had enough money to live comfortably in retirement. Accordingly, improved systems and methods for encouraging the public to invest capital in investment vehicles with favorable long-term return prospects are desirable.

SUMMARY

Several embodiments are shown herein directed to a method of investing. The method comprises providing a collective investment entity that offers shares of stock in the investment entity for sale to investors, and receiving requests from a plurality of investors to purchase shares of stock in the collective investment entity. The shares of stock can be subject to a qualifying period, such as a predetermined period of time. The method further comprises allocating disbursement value, and determining a number of eligible investors from among the plurality of investors. The investors are eligible by virtue of owning at least one eligible share of stock. If desired, the number of opportunities for receiving the disbursement capital, or a portion thereof, can be based on the number of eligible shares. A disbursement event can be conducted, wherein the disbursement value is disbursed to at least one eligible investor chosen in a lottery selection process from among the eligible investors. An eligible share of stock comprises a share of stock that has remained under the ownership of a single investor for the duration of the qualifying period.

In another representative embodiment, a method of linking investing with lottery events comprises establishing a collective investment entity and selling shares in the investment entity to a plurality of investors, wherein the shares are subject to a qualifying period comprising a predetermined length of time. The method further comprises allocating disbursement value, and determining a number of eligible investors and/or shares. Eligible investors can be determined based on whether at least one share of eligible stock is owned for a length of time that is at least as long as the qualifying period. In some embodiments, the number of opportunities to be chosen in the disbursement event is directly related to the number of qualified shares owned by any investor. For example, for each eligible share an investor can be entitled to one chance for being chosen for the disbursement event. Finally, the method comprises conducting a disbursement event, wherein the disbursement value can be disbursed to at least one eligible investor in a lottery event.

In another representative embodiment, a method of linking investing with lottery events includes receiving investment value from a plurality of investors, investing at least a portion of the investment value in at least one collective investment entity, receiving an investment fee from the plurality of investors, designating at least a portion of the investment fee as a disbursement value for disbursement in a disbursement event, selecting at least one of the plurality of investors as a disbursement receiver in the disbursement event, the selection of the one or more disbursement receivers being based on a chance-based selection event, and disbursing the disbursement value to the one or more disbursement receivers.

The foregoing and other objects, features, and advantages of the invention will become more apparent from the following detailed description, which proceeds with reference to the accompanying figures.

DETAILED DESCRIPTION

Figure 1:
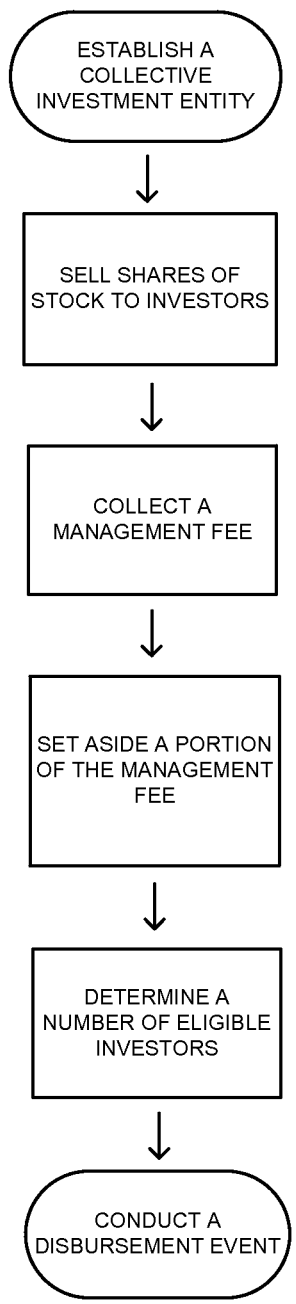
FIG. 1 is a flow chart of a method of investing.

For purposes of this description, certain aspects, advantages, and novel features of the embodiments of this disclosure are described herein. The disclosed methods, apparatuses, and systems should not be construed as limiting in any way. Instead, the present disclosure is directed toward all novel and nonobvious features and aspects of the various disclosed embodiments, alone and in various combinations and sub-combinations with one another. The methods, apparatus, and systems are not limited to any specific aspect or feature or combination thereof, nor do the disclosed embodiments require that any one or more specific advantages be present or problems be solved.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods. Additionally, the description sometimes uses terms like "provide" or "achieve" to describe the disclosed methods. These terms are high-level abstractions of the actual operations that are performed. The actual operations that correspond to these terms may vary depending on the particular implementation and are readily discernible by one of ordinary skill in the art.

As used in this application and in the claims, the singular forms "a," "an," and "the" include the plural forms unless the context clearly dictates otherwise. Additionally, the term "includes" means "comprises." Further, the terms "coupled" and "associated" generally mean electrically, electromagnetically, and/or physically (e.g., mechanically or chemically) coupled or linked and does not exclude the presence of intermediate elements between the coupled or associated items absent specific contrary language.

As used herein, the terms "lottery" or "chance-based selection event" refer to events where the outcome is determined by chance, including events where there is always a winner (e.g., a raffle) and events where there may or may not be a winner (e.g., state lottery events).

As used herein, the term "collective investment entity" refers to an organization or business entity formed for the purpose of collectively investing in investment property such as stocks, bonds, or other securities, commodities, or other assets. The terms "investment entity" or "investment vehicle" refer to any investment that can increase in value, including collective investment entities.

As used herein, the term "allocated disbursement value" refers to cash, equity, or other value allocated or set aside by the collective investment entity. For example, "allocated disbursement value" can be some portion of value allocated from a fee such as a management fee, 12b-1 fee, or any other fee collected by an investment entity whether paid expressly or netted from returns.

As used herein, the term "disbursement event" refers to any event in which a collective investment entity provides an opportunity to investors to obtain a disbursement. The terms "disbursing" or "disbursement" refer to the distribution of value in the form of cash, stock, or other similar bases, to one or more investors in the collective investment entity separate from and/or in addition to the payment of dividends or other distributions normally attendant to investing, such as capital gains. As discussed in more detail below, a "disbursement event" may or may not result in a "disbursement."

As used herein, the term "eligible shares" refers to shares in an investment and/or the value of an investment that is used to determine eligibility and/or eligible chances for selection in a disbursement event.

As used herein, the term "investment fee" refers to any fee received in connection with the operation of an investment, including a management fee, fee associated with a disbursement event or disbursement value, or any other similar fees, costs, or expenses. As used herein, the term "investment value" refers to a value that is provided by an investor for investment in any investment vehicle(s), including, for example, investments in collective investment entities.

Referring to FIG. 1, a method of investing is schematically shown, wherein shareholders or investors in an investment vehicle earn returns on their investment as the assets of the investment vehicle increase or decrease in value, and also participate in a lottery disbursement of value. In some embodiments, the method comprises four steps.

The first step of the method comprises establishing a collective investment entity, such as a mutual fund company, hedge fund company, exchange traded fund, commodity fund, real estate fund, target term trust, UCITS fund, or other collective investment vehicles. Any such investment entities can include funds that are open-ended or close-ended funds. The investment entity acquires and/or trades in securities and other investment property. The investment entity can be managed by a fund or portfolio manager and/or team, or the like. If desired, management of the investment entity can be driven and/or guided by algorithms or various software-based systems that utilize proprietary strategies and/or are matched to one or more indexes. Regardless of the portfolio management strategy, shares can be issued in the investment entity for purchase by investors.

The second step comprises allocating value for disbursement as disbursement value. In some embodiments, the allocating value step can comprise collecting a management fee from the investors in the investment entity and setting aside a portion of the management fee as disbursement value. The management fee can be based upon, for example, a percentage of value of the investment entity's assets, or some other agreed upon metric. In the embodiment shown, the disbursement value comprises a percentage of the management fee (e.g., five basis points) and is set aside for disbursement to qualifying investors of the investment entity in a lottery disbursement event. In this manner, the investment method does not impact the management strategy of the fund manager or affect the risk and return profile attendant to investing in the investment entity, other than the possible reduction of return caused by the setting aside of the disbursement value. Alternatively, some or all of the disbursement value can come from any other suitable revenue source such as gross earnings, accumulated interest, incentive fees, increased management fees, etc.

The third step comprises determining a number of eligible investors for participation in the disbursement event. In one embodiment, eligibility is determined by whether an investor owns an "eligible share." Desirably, the criterion that determines whether a share is eligible is the "qualifying period," or a predetermined length of time during which the share must remain in the ownership of a single investor. When a share has been owned by a single investor for the duration of the qualifying period, the share becomes an "eligible share" and qualifies the investor to participate in future disbursement events, until the share is sold.

Changes in ownership of the shares from sales or redemptions (e.g., in an open end fund) can result in a resetting of the qualifying period associated with that share. For example, when an eligible share is sold from one investor to a second investor, the share can lose its "eligible share" status and must be held by the subsequent investor for a period equal to the qualifying period before regaining "eligible share" status. Likewise, when a share is sold by one investor before it gains "eligible share" status, the qualifying period can reset and the subsequent investor would then be required hold the share for the entirety of the qualifying period regardless of the length of time the share was held by the previous investor. In addition, for new shares created by a fund, owners of new shares must similarly hold those shares for a period equal to the qualifying period before they are can provide eligibility for a disbursement event. In other alternative embodiments, as discussed in more detail below, certain permitted share transfers may maintain their eligibility, or continue the period of ownership towards eligibility, after such transfers.

In one embodiment, the qualifying period is twelve consecutive months. Thus, any share that has been owned by a single investor for twelve consecutive months is an "eligible share" and qualifies the investor as an eligible investor. Desirably, ownership of a single eligible share qualifies an investor as an eligible investor for purposes of participating in the disbursement event. However, an investor's eligibility to participate in the disbursement event may be determined by ownership of any suitable number of eligible shares.

Additionally, ownership of an eligible share qualifies an investor to participate in the disbursement event even though the investor may own other shares in the investment entity which are not yet eligible (i.e., have been owned by the investor for a period of time less than the qualifying period). In this manner, the disclosed method incentivizes individuals to make long-term investments by purchasing shares of the investment entity and holding them for at least the duration of the qualifying period. In alternative embodiments, the qualifying period can comprise any suitable length of time (e.g., three months, six months, eighteen months, etc.). In some embodiments, there is no qualifying period, such that investors become eligible to participate in the disbursement event immediately upon acquiring shares in the investment entity.

The number of opportunities for obtaining the disbursement value (i.e., chances to win) can be based on the number of eligible shares (e.g., a number of shares or investment amount) owned by any single investor. For example, in some embodiments, for each eligible share an investor receives one opportunity to win. Alternatively, if based on dollars invested, for each predetermined amount of value invested in a participating investment, an investor can receive one opportunity to win. For example, if a predetermined dollar amount for obtaining an opportunity to win is $100, an investor with $1,000 of investment in eligible investments would receive ten opportunities to win (assuming the investor has met any time-based eligibility requirements for ownership).

Eligibility for obtaining opportunities to participate in disbursement events can be investment-specific (e.g., based on ownership of participating funds) or they can be investment manager specific (e.g., based on investment value received by a manager, management group, etc. that participates in disbursement events). For example, if eligibility is investment-specific, an investor can be required to own shares of specific funds that are designated as funds that participate in disbursement events. On the other hand, if eligibility is manager-specific, then that investor's eligibility for disbursement events can be based on the investment value that has been invested with a particular manager, management group, etc.

In some embodiments, share mobility (e.g., transfer of shares from one investment to another without losing eligibility) can be permitted. In order to more easily track eligibility for disbursement events, it can be preferable to base eligibility on value rather than number of shares owned. In systems that permit share mobility, investors can maintain eligibility for disbursement events even though they have sold or transferred eligible shares as long as the sale or transfer of investments is from one investment that confers eligibility to another investment that confers eligibility. In this manner, a transfer of value from a first designated investment entity to a second designated will effectively maintain eligibility for any disbursement event. In some cases, transfers of value can be limited to transfers within a particular fund. However, if desired, transfers of value can be permitted across various funds or other investments so long as each fund or investment qualifies for eligibility. In the event of such transfers of value, eligibility based on number of shares and/or a dollar value of the shares can be maintained when transferred to a second investment entity. Thus, for example, if a value of $10,000 was transferred from an aggressive equity growth fund to a more conservative balanced fund, the number of eligible shares can be maintained based on the dollar value of the investment in the second fund.

The fourth step comprises conducting the disbursement event. In some embodiments, the disbursement event is a lottery event where one or more winners are chosen at random from among the eligible participants according to odds established by the number of distribution events conducted and/or number of eligible shares outstanding. The "number of eligible shares outstanding" refers to the number of shares owned by investors that are "eligible shares." Desirably, the odds of winning the disbursement event are evenly distributed among the number of eligible shares outstanding (i.e., each eligible share of the investment entity represents an equal chance to win). For example, for an investment entity in which there are one hundred eligible shares, each eligible share represents a $1/100$ chance of winning a disbursement event. In this manner, a particular investor's odds of winning increase in proportion to the number of eligible shares the investor owns, and are not affected by the number of non-eligible shares the investor owns (e.g., an investor who owns twenty eligible shares of one hundred total eligible shares outstanding has a twenty-percent chance of winning the disbursement event, regardless of the number of non-eligible shares the investor owns). Thus, investors are incentivized to continue investing their capital in shares of the investment entity and retaining those shares beyond the qualifying period so as to increase their odds of winning the disbursement event.

In one embodiment, a disbursement event "winner" is chosen through a simple drawing wherein, for example, the serial numbers of all eligible shares are compiled and a winning share is selected at random. In this manner, one or more investors are selected as the winner(s) and the selected investor(s) receives the total amount of disbursement value or their allocated share of the disbursement value if more than one winner is selected. When winners are selected using a raffle-type system, the manner of selection of the winner or winners of any amount of disbursement value from the number of eligible participants or shares should be sufficiently random. For example, any physical drawing of a winner requires that thorough mixing of the physical indicators (e.g., tickets or stubs) that associate shares with individual investors prior to drawing a ticket. Other methods for selecting winners can be non-physical and rely on software to randomly select a winner from eligible shares. Such systems should be sufficiently random to ensure that all equal shares have an equal likelihood of being selected.

In some embodiments, the selected investor(s) can elect to wager disbursement value "won" in a prior lottery in a subsequent lottery. For example, if a "winner" received a disbursement value the "winner" could "let it ride" by obtaining additional chances to win in a subsequent drawing. In the event that a disbursement event is based on a lottery drawing and produces no winner, the disbursement value can carry over, or can increase in the manner of a progressive jackpot until a "winning" investor(s) is selected.

In other embodiments, the disbursement event can involve greater investor participation. That is, instead of using a raffle-type selection process, eligible investors can actively participate in the selection of the "tickets" that provide them a chance to win all or a portion of the disbursement value. For example, in one embodiment, eligible investors can "wager" by selecting a series of numbers from a set range of numbers (e.g., 1 through 80). The disbursement event can then proceed by drawing a series of numbers at random from the set range, as in the casino game "Keno." In this manner, the disbursement value may be distributed among multiple "winners," depending upon the investors' number selections.

Other methods of distributing the disbursement value to eligible investors can be provided that include some combination of "gaming" and "random chance." Although additional gaming elements may increase the overall risk to the investor of the investment disbursement strategy, it may be desirable to some investors. For example, in some embodiments, users can be provided with a unit value for their "eligible shares" and these units can be wagered in one or more underlying gaming events in which the user can increase their unit value (or decrease their unit value if unsuccessfully wagered). For example, users can be provided with the opportunity to participate in traditional gambling games (e.g., blackjack, poker, roulette, etc., in which they can try to increase the number of units attributable to them in a disbursement event. In some embodiments, the disbursement event can include multiple prizes (e.g., $10/units, $100/units, $1000/units, etc.) and/or multiple lottery rounds.

The disbursement should not exceed the amount of value set aside previous to the event. Thus, the underlying fund shares and the management of those shares should not be impacted by a disbursement, except as previously noted (e.g., the return to fund shares may be reduced only by the predetermined amount of capital to be set aside for disbursements).

After closure of the "gaming" portion, the final tally of units owned by eligible participants can be used as the basis for the random chance drawing. In some embodiments, the increase or decrease in the number of units during the "gaming" portion can be restricted so that each investor with eligible shares can participate in the random chance drawing. Thus, for example, the system may limit any increase or decrease of units during the gaming portion to 50% of the original units.

The investor or investors who are chosen in the disbursement event can then receive the disbursement value. The disbursement value can take the form of, for example, cash or cash equivalents, such as coupons, vouchers, etc., or investment property, such as stock, bonds, etc. In some embodiments, the disbursement value can be additional shares of the investment entity, or the winning investors can elect to convert the disbursement value into additional shares of the investment entity. Those investors who do not win the disbursement event or are not eligible to participate suffer no penalty, and continue to receive the benefits attendant to traditional long-term investing and remain eligible to participate in subsequent disbursement events once their shares become eligible. In this manner, the investment method promotes long-term saving by infusing the investment process with the excitement of lottery games, but without the associated risk.

In some embodiments, the disbursement event can be periodic (i.e., disbursement events can occur at regular intervals according to a schedule, such as annually, quarterly, etc.). In this manner, accumulated capital is disbursed in whatever amount has accrued over the elapsed period of time from the previous disbursement event. Alternatively, the disbursement event can occur when the amount of disbursement capital reaches a threshold value (e.g., ten thousand dollars, one million dollars, etc.). The timing of the disbursement event can also be random, or can occur at any other suitable time or be triggered by any other suitable event. Throughout the period between disbursement events, the investors continue to receive dividends and all other payments they would otherwise be entitled to receive, as with traditional investment vehicles, and are free to sell their shares or acquire additional shares in this or any other investment entity.

In some embodiments, the investment entity (e.g., mutual fund company, hedge fund company, etc.) may choose to link the different investments it holds (e.g., mutual funds, hedge funds, etc.) such that disbursement value accrues in the manner of a progressive jackpot where holders of different but related fund shares all participate in the same disbursement events (i.e., disbursement value accruements from all investments held by the investment entity are consolidated and disbursed in a single disbursement event). In a similar fashion, in embodiments involving more than one related investment entity, the disbursement value accruements from all the investment entities can be consolidated and disbursed in a single disbursement event. Alternatively, the investments held by the investment entity can accrue disbursement value separately, or in any desired combination, which can then be disbursed in separate disbursement events.

The disbursement events can be conducted by the manager of the investment entity, or by a third party at the direction of the manager. Likewise, the disbursement value can be managed by the manager or a third party, and either the manager or the third party can be responsible for notifying the winner(s) of the disbursement event and distributing the disbursement value to the selected investor(s). Unless otherwise required by law, the selected investor can receive value from the disbursement event without separate acknowledgement of his or her selection as a recipient of the disbursement value. That is, upon being selected to receive disbursement value, the designated amount of disbursement value can be automatically transferred to the selected investor(s) without any required action by the investor. In the event that investors can receive the selected disbursement value in different manners, the participating investor can designate the manner in which they wish to receive the disbursement value in advance of the disbursement event. For example, the investor can designate a bank account into which they wish to have the disbursement value deposited should they be selected to receive value in the disbursement event.

In some embodiments, as the frequency of disbursement events increases and/or the amount of disbursement value increases, the investment entity can choose to highlight its disbursement events in the same manner that large lottery winnings are publicized (i.e., in the news media, etc.). In this manner, new investors can be made aware of the investment entity and as the fund and number of investors grows, disbursement event frequencies and/or disbursement value amounts can similarly increase.

Accordingly, using the systems and methods described herein, investors can make long-term investments and, at the same time, participate in lottery-style disbursement events that they may normally enjoy.

Example 1

In a first working example, a collective investment entity in the form of a mutual fund company is provided in month zero. The mutual fund company is managed by a fund manager, owns securities assets or other investment property, and issues one hundred shares of stock. The shares have a qualifying period of twelve months. In month zero, investors A-C each purchase twenty shares of stock and investors D-G each purchase ten shares of stock. Beginning in month one, the mutual fund company regularly allocates value, such as by assessing investors A-G a monthly management fee based upon the net asset value of the investment property owned by the mutual fund company. The mutual fund company sets aside five basis points of this management fee every month (on an annual rate basis) as distribution value. In month eight, investor G sells his ten shares to investor H.

At the end of month twelve in this example, the shares owned by investors A-F become eligible shares, the mutual fund company has accrued one thousand dollars of disbursement value, and the mutual fund company holds its first disbursement event. The disbursement event is conducted as a drawing, wherein the serial numbers of the eligible shares are compiled and the serial number of a single share is selected at random. There are ninety eligible shares. Thus, investors A-C's chances of winning are each 20/90. Investors D-F's chances of winning are each 10/90. Investor H is not yet eligible to participate in the distribution event because she has only held her shares for four months of the twelve-month qualifying period. The serial number of a share owned by investor B is chosen at random, and the mutual fund company disburses the one thousand dollars of disbursement value to investor B.

Example 2

In a second working example, a collective investment entity such as a hedge fund company is established in month zero. The hedge fund company is managed by a fund manager, owns securities or assets or other investment property, and issues one hundred shares of stock. The shares have a qualifying period of twelve months. In month zero, investors A-J each purchase ten shares of stock. Beginning in month one, the hedge fund company regularly allocates value, such as by assessing investors A-J a monthly management fee based upon the net asset value of the investment property owned by the hedge fund company. The hedge fund company sets aside five basis points of the management fee every month as distribution value at an annual rate. The first disbursement event is set to occur either when at least one share of stock becomes an eligible share of stock, or upon the amount of distribution values reaching one thousand dollars, whichever occurs later. After twelve months, the shares of stock owned by investors A-J become eligible shares, and the hedge fund company has accumulated two thousand dollars of disbursement value.

In this example, the disbursement event can be conducted as a game of Keno or the like in which each eligible investor is allowed to submit a number of wagers corresponding to the number of eligible shares owned by that investor. Thus, each of investors A-J is allowed to submit ten wagers. A third party conducts the disbursement event, and investors B, D, F, and H win the disbursement event and share in the disbursement value.

Implementation of the Systems and Methods Disclosed Herein Using Software

The methods or systems for investing described herein can also be implemented in a computing environment in which the investors connect to the investment entity over the Internet via remote computing devices. The investment entity can make certain functionality available online, such as the ability to buy and sell shares in the investment entity and change settings relating to the disbursement events online. The disbursement value can also be automatically deposited into a winning investor's account over the Internet.

For example, in some embodiments, current investors, or potential investors, can register with the system by exchanging information between a client computer (e.g., the user's computer) and a server, as described below. During the registration step, the investor or potential investor can create (or be provided) a unique identifier for their account and a password that permits them access to their account. Once registered with the system, the investor or potential investor can purchase shares in the investment entities described herein and make choices relating to how certain aspects of those investment entities will be performed. Such choices can include, for example, selecting the manner in which any disbursement event will distribute value to the investor and the type of disbursement events to participate in (e.g., disbursement events associated with one particular fund or those associated with a larger group of related funds).

Figure 2:
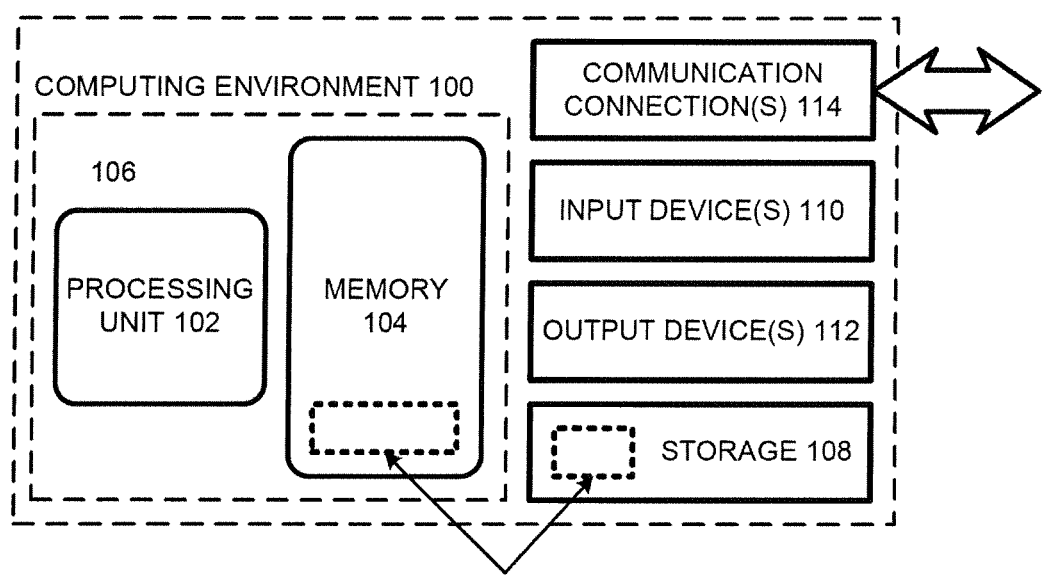
FIG. 2 is a schematic block diagram of an exemplary computing system on which certain embodiments of the systems and methods disclosed herein can be implemented.

FIG. 2 illustrates a generalized example of a suitable computing environment 100 in which several of the described embodiments can be implemented. The computing environment 100 is not intended to suggest any limitation as to scope of use or functionality, as the methods described herein can be implemented in diverse general-purpose or special-purpose computing environments. With reference to FIG. 2, the computing environment 100 includes at least one processing unit 102 and memory 104. In FIG. 2, this most basic configuration 106 is included within a dashed line. The processing unit 102 executes computer-executable instructions and may be a real or a virtual processor. In a multi-processing system, multiple processing units execute computer-executable instructions to increase processing power. The memory 104 may be volatile memory (e.g., registers, cache, RAM), non-volatile memory (e.g., ROM, EEPROM, flash memory, etc.), or some combination of the two. The memory 104 stores software 116 implementing one or more of the systems described herein. The computing environment may have additional features. For example, the computing environment 100 includes storage 108, one or more input devices 110, one or more output devices 112, and one or more communication connections 114.

Figure 3:
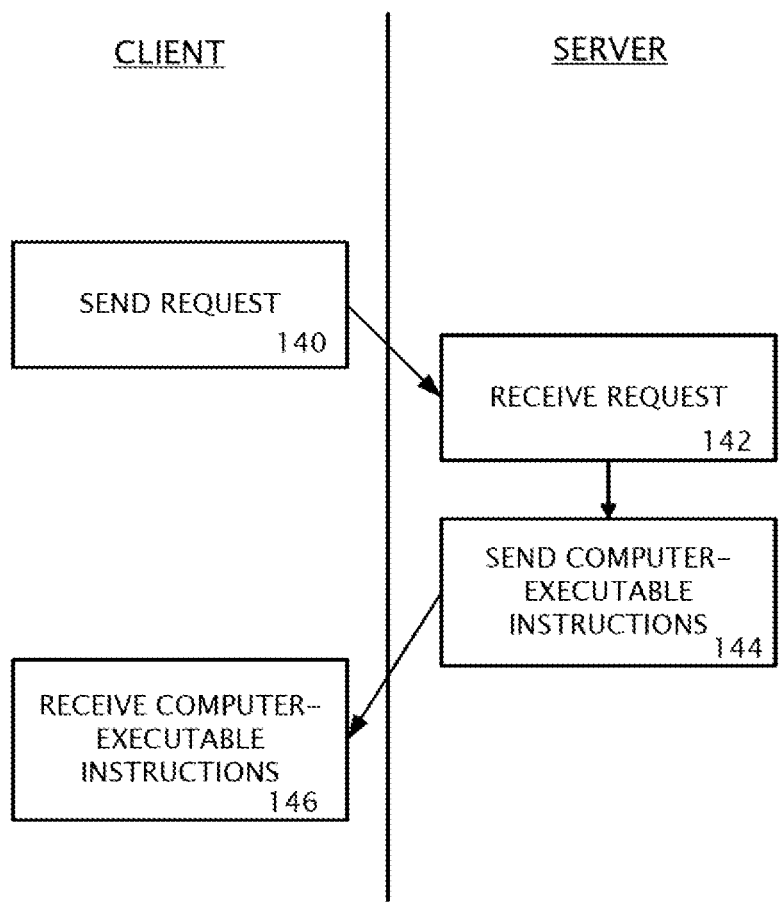
FIG. 3 is a block diagram illustrating how the computer networks can be used to register an account with a collective investment entity.

FIG. 3 shows one exemplary manner in which computer-executable instructions for performing any of the disclosed embodiments can be transmitted, accessed, or received using a remote server computer or a remote computing environment. At process block 140, for example, the client computer sends a request to register with the investment system. In process block 142, the registration request is received by the remote server or by respective components of the remote computing environment. In process block 144, the remote server or computing environment transmits computer-executable instructions for performing registration of an investor to the client computer. At 146, the computer-executable instructions are received (e.g., stored, buffered, and/or executed) by the client computer. In this manner, the investor can create an account and manage investments with the investment system over the Internet.

Figure 4:
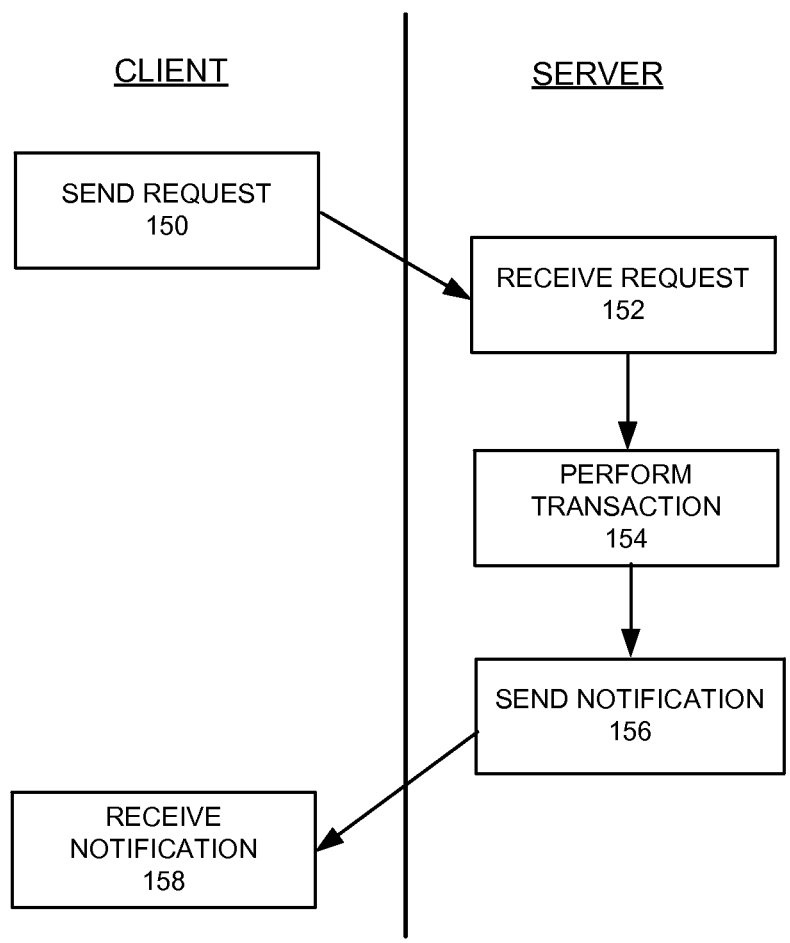
FIG. 4 is a block diagram illustrating how the computer networks can be used to purchase shares in a collective investment entity.

Once registered, the investor can continue to communicate with the remote server to perform any of the methods or techniques disclosed herein. For example, once the investor has established an account, the client computer can send a request to purchase shares in a collective investment entity associated with the investment system in process block 150 of FIG. 4. The request can be received and processed by the server or remote computing environment in process block 152. The server can then perform the share purchase transaction in process block 154. After performing the transaction, the server can send a notification to the investor in process block 156, which can be received by the investor in block 158.

Figure 5:
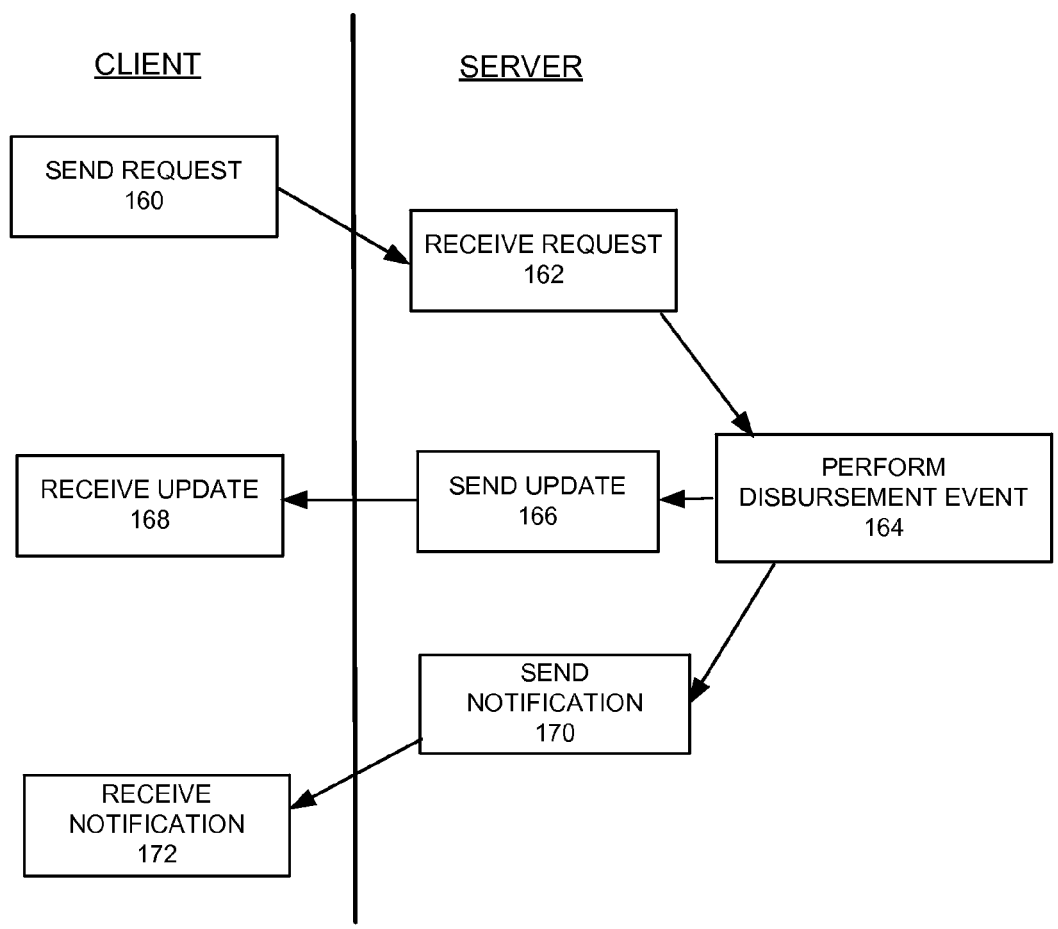
FIG. 5 is a block diagram illustrating how the computer networks can be used to conduct a disbursement event.

Similarly, the computing environment can receive and process account settings and preferences sent by the investor, such as parameters associated with disbursement events, as shown in FIG. 5. In process block 160, the investor can send a request to the remote server to participate in a disbursement event. The request can contain, for example, wager information, any preferences particular to the type of disbursement event being held, the investor's preferred method of receiving any disbursement value, etc. In process block 162, the server can receive and process the request such that the investor is entered into the next disbursement event according to, e.g., the number of eligible shares owned by the investor. The server can then perform the disbursement event at process block 164, and send an update 166 to the investor while the disbursement event is in progress, which can be received by the investor at 168. At the conclusion of the disbursement event, the server can then send a notification of the winner(s) of the disbursement event to the investor at 170, which can be received by the investor at 172. The computing environment can also receive and process investor requests with respect to investment strategy, such as buy/sell requests regarding shares in the collective investment entity or other investment vehicles.

In some embodiments, the computing environment can be configured to track data associated with various parameters of the investment system (e.g., share price, eligible share status, amount of allocated disbursement value, etc.) and make available or display those data to the investor over the computer network. For example, when the investor is logged into their account, the computing environment can display information relating to the current share price of the collective investment entity, the eligibility status of shares owned by the investor, the value of the investor's portfolio, the type and/or timing of the next disbursement event, notifications about the investor's participation in previous disbursement events, etc.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. I therefore claim as my invention all that comes within the scope and spirit of these claims.

I claim:

1. A method of investing over a computer network that promotes long-term saving, comprising the steps of:
   providing a collective investment entity that offers shares of stock in the investment entity for sale to investors, the collective investment entity providing investment returns earned on investment property to purchasers of the collective investment entity;
   receiving one or more requests via a computer network from a plurality of investors to purchase shares of stock in the collective investment entity, the requests being transmitted from one or more client computers across the computer network, the shares of stock being subject to a qualifying period comprising a predetermined period of time;
   processing the received requests, using a processor, and purchasing shares of stock in the collective investment entity based on the processed requests;
   allocating one or more disbursement values, the one or more disbursement values being separate from the investment returns provided to purchasers of the shares of stock in the collective investment entity;
   determining a number of eligible investors from among the plurality of investors, the investors being eligible by virtue of owning at least one eligible share of stock; and
   conducting one or more disbursement events, wherein the one or more disbursement values are disbursed to at least one eligible investor chosen in a lottery selection process from among the eligible investors;
   wherein an eligible share of stock comprises a share of stock that has remained under the ownership of a single investor for the at least the duration of the qualifying period.

2. The method of claim 1, wherein allocating one or more disbursement values comprises collecting an investment fee from the investors and allocating at least a portion of the fee as a disbursement value.

3. The method of claim 1, wherein the qualifying period is twelve months.

4. The method of claim 1, wherein the disbursement event is conducted periodically.

5. The method of claim 4, wherein the disbursement event is conducted quarterly.

6. The method of claim 1, wherein the disbursement event is conducted when the amount of disbursement value reaches a predetermined threshold amount.

7. The method of claim 6, wherein the threshold amount is greater than ten thousand dollars.

8. The method of claim 6, wherein the threshold amount is greater than one hundred thousand dollars.

9. The method of claim 1, further comprising providing respective eligible investors with a number of opportunities to be selected as the receiver of the disbursement value that is proportionate to the number of eligible shares owned or a dollar value associated with the number of eligible shares owned.

10. The method of claim 1, wherein at least some of the one or more disbursement events are conducted in a manner that does not result in at least one eligible investor being chosen in the lottery selection process.

11. The method of claim 1, wherein:
    the disbursement value is drawn from an overall investment increase; and
    the investment returns is the overall investment increase less the disbursement value.

12. The method of claim 1, wherein the investment returns are dividends.

13. The method of claim 1, further comprising allowing one or more investors to transfer value associated with their shares of stock between various types or groupings of investment property owned by the collective investment entity.

14. The method of claim 1, further comprising:
    allowing one or more investors to transfer value associated with their shares of stock between one or more designated collective investment entities; and
    wherein the transfer does not affect the eligibility status of the one or more investors.

15. The method of claim 1, wherein the investment property comprises one or more instruments selected from stocks, bonds, securities, and commodities.

16. A method of investing over a computer network that promotes long-term saving, comprising the steps of:
    providing a collective investment entity that offers shares of stock in the investment entity for sale to investors;
    receiving registration information from a plurality of investors via the computer network;
    receiving one or more requests via the computer network from the plurality of investors to purchase shares of stock in the collective investment entity;

processing the received requests, using a processor, and purchasing shares of stock in the collective investment entity based on the processed requests, the shares of stock being subject to a qualifying period comprising a predetermined period of time;

purchasing investment property, the investment property being managed by the collective investment entity;

allocating one or more disbursement values;

determining a number of eligible investors from among the plurality of investors, the investors being eligible by virtue of owning at least one eligible share of stock; and conducting one or more disbursement events, wherein the one or more disbursement values are disbursed to at least one eligible investor chosen in a lottery selection process from among the eligible investors;

wherein an eligible share of stock comprises a share of stock that has remained under the ownership of a single investor for the at least the duration of the qualifying period; and wherein allocating one or more disbursement values comprises collecting an investment fee from the investors and allocating at least a portion of the fee as a disbursement value;

whereby the investors earn returns on the investment property owned by the collective investment entity as the investment property increases or decreases in value separate from and in addition to any disbursement value distributed in the one or more disbursement events.

* * * * *